(12) United States Patent
Billings

(10) Patent No.: US 9,363,257 B2
(45) Date of Patent: Jun. 7, 2016

(54) SECURE FEDERATED IDENTITY SERVICE

(71) Applicant: Roger E Billings, Independence, MO (US)

(72) Inventor: Roger E Billings, Independence, MO (US)

( * ) Notice: Subject to any disclaimer, the term of this patent is extended or adjusted under 35 U.S.C. 154(b) by 0 days.

(21) Appl. No.: 14/049,191

(22) Filed: Oct. 8, 2013

(65) Prior Publication Data

US 2015/0100777 A1    Apr. 9, 2015

(51) Int. Cl.
*H04L 29/00* (2006.01)
*H04L 29/06* (2006.01)

(52) U.S. Cl.
CPC .................. *H04L 63/0815* (2013.01)

(58) Field of Classification Search
CPC combination set(s) only.
See application file for complete search history.

(56) References Cited

U.S. PATENT DOCUMENTS

2012/0011567 A1* 1/2012 Cronk et al. ............... 726/4
2013/0117861 A1* 5/2013 Aussel et al. ............. 726/29

* cited by examiner

*Primary Examiner* — Ghazal Shehni

(57) ABSTRACT

Federated identity is the means of linking a person's electronic identity and attributes, such that the user can be authenticated with a single sign-on, across multiple systems and organizations. A system and a method is proposed to provide a unique user digital identifier which is different for each security identity services subscriber.

5 Claims, 1 Drawing Sheet

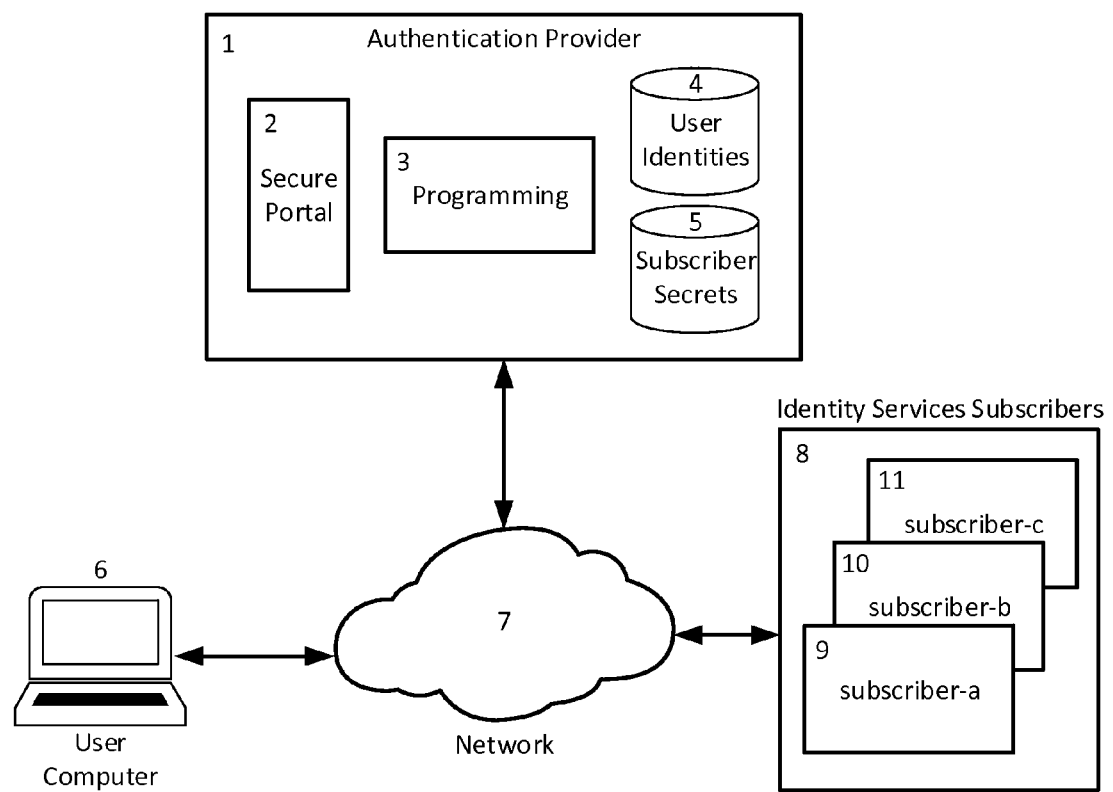

SECURE FEDERATED IDENTITY SERVICE

BACKGROUND OF THE INVENTION

Federated identity management is an arrangement that can be made between multiple enterprises which allows users access to all of the digital resources of the group utilizing the same identification credentials. It amounts to having a common set of policies, practices and protocols in place to manage the identity and trust of individuals across organizations.

Federated identity management allows users to use single sign-on in which a user's single authentication token is trusted across multiple information technology systems and across multiple organizations. Technologies used for federated sign-on include Open ID, OAuth, and SAML.

In many current installations, federated logon is accomplished when a relying party accepts user authentication from an identity provider as in the case of OpenID. Often the users are authenticated by simply entering a user name and password. The industry is now moving towards the more secure solution of two-factor authentication based on the premise of something you know (your password) and something you have (a security token).

In these types of security systems, the user digital identifier plays an important role in the authentication process. For several years, a person's Social Security Number was used as a convenient method of manual identification since each person had one and only one number, and all of the numbers were unique. Some states adopted the practice of using the federal Social Security Number as the driver's license number. Over time, this practice had to be abandoned as the widespread usage of social security numbers as a means of identity authentication opened the door to identity theft. Care should now be taken to assure that a unique and different user identifier be used for each subscriber in a federated identity system.

SUMMARY OF THE INVENTION

The present invention is directed towards a process for providing federated identity services from an authentication provider in which the user's digital identifier is unique and unrelated for each subscriber.

The user's digital identifier is used by subscribers to keep track of a user in their database where access privileges and other user information may be stored. The identifier is like a user number and as such, needs to be unique from other users in a subscriber's system. In the event, however, that an intruder gains access into a subscriber computer system, the intruder could gain access to the identifier of one or more users. If the same user digital identifier were to be used by multiple identity services subscribers, once the user identifier is compromised from one system, that information could be used as a tool to help gain access to the user's information on other subscriber systems. To prevent this from happening, the identity provider should issue different user digital identifiers to each service subscriber, even for the same person.

DETAILED DESCRIPTION OF THE INVENTION

Referring to FIG. 1, in a preferred embodiment of the invention, the authentication provider 1 is a service organization that provides federated identity services to various identity services subscribers 8. In this example, the user computer 6 directs a web browser to the URL of subscriber-b 10, whereupon, the user is re-directed to the authentication provider 1. The user computer 6 could be a desktop, laptop, or mobile computer. The user is instructed to insert a security token in the USB port of the user computer 6 or to logon with a soft token. In either case, after the user enters the PIN associated with the token, the user is authenticated over the network using a secure, two-factor authentication method and the user identities 4 database. Upon successful authentication, notice is forwarded from the authentication provider 1 to the appropriate subscriber, in this case, subscriber-b 10.

To communicate the successful authentication to the subscriber, the authentication provider 1 sends the user's digital identifier to the subscriber-b 10 so the subscriber will know which user has been authenticated. To provide optimal security, the user digital identifier must be made unique before being sent to different subscribers. This is accomplished by using the correct subscriber secret 5 to encrypt the user digital identifier before transmission to an identity services subscriber 8.

When a new subscriber is enrolled as a customer of the authentication provider 1, a hardware generated random number is created by the authentication provider 1, and is stored in subscriber secrets 5 which is a database containing a subscriber secret for each subscriber.

Before sending the above mentioned authentication success message to subscriber-b 10, the authentication provider 1, uses the appropriate encryption key stored in subscriber secrets 5, to encrypt the user's digital identifier. All of the user digital identifiers that are sent to any subscribers 8 from the authentication provider 1 are always encrypted in this way. As a result, each subscriber 8 only knows a hidden version of the user's digital identifier which is then unique for each subscriber.

In this way, it is not necessary for the identity services subscribers to decrypt the user's digital identifier or to even know the encryption key used by the authentication provider 1 since the only version of the user's digital identifier they will ever use or know is the encrypted version.

In another preferred embodiment of the invention, a secure portal 2 can be utilized to provide a secure channel of communication between a user computer 6 and the authentication provider 1, and between the authentication provider 1 and the identity services subscribers 8. The secure portal 2 creates a secure communication link by utilizing pre-learned secrets stored in security tokens, soft-tokens, and in the secure portal 2.

What is claimed is:

1. A federated identity authentication system comprising:
   a user computer;
   one or more users requiring access to privileges from one or more identity services subscribers;
   an identity authentication provider having capabilities to securely authenticate a user, by determining each user's unique digital identifier;
   an ability to generate encryption secrets; and a database in which to store the encryption secrets:
   the one or more identity services subscribers providing the required access privileges to the one or more users, and relying on authentication services from the identity authentication provider; and
   wherein the identity authentication provider creates a subscriber secret that is unique for each subscriber such that each time the user authenticates for the purpose of gaining access from the subscriber, the associated subscriber secret is used to encrypt the user's unique digital identifier before sending the user's unique digital identifier from the identity authentication provider to the subscriber.

2. The federated identity authentication system of claim 1, wherein the subscriber never learns the subscriber secret associated with an subscriber's account and only receives the user's unique digital identifier in the encrypted form.

3. The federated identity authentication system of claim 1, wherein a secure portal is used to establish a secure channel between the user computer and the identity authentication provider.

4. The federated identity authentication system of claim 1, wherein a secure portal is used to establish a secure channel between the identity authentication provider and the one or more identity services subscribers.

5. A method of providing authentication services comprising:
- one or more users requiring access to privileges from one or more identity services subscribers;
- an identity authentication provider having capabilities to securely authenticate a user, by determining each user's unique digital identifier;
- creating a subscriber secret by the identity authentication provider at the time a subscriber is enrolled with the identity authentication provider for services, the associated subscriber secret is used to encrypt the user's unique digital identifier before sending the user's unique digital identifier from the identity authentication provider to the subscriber;
- storing the subscriber secret in a database operated by the authentication provider such that the subscriber secret can be retrieved to be used as an encryption key associated with the subscriber.

\* \* \* \* \*